Feb. 22, 1927. 1,618,671
H. PICK
DIAPHRAGM VALVE
Filed June 25, 1921

INVENTOR
Hans Pick
BY John Lyka
ATTORNEY.

Patented Feb. 22, 1927.

1,618,671

UNITED STATES PATENT OFFICE.

HANS PICK, OF BERLIN-DAHLEM, GERMANY.

DIAPHRAGM VALVE.

Application filed June 25, 1921, Serial No. 480,334, and in Germany November 30, 1920.

Many forms of valves for protective masks are already known. None of them, however, have permanently satisfied the high claims made on such valves. The difficulty in the construction of valves for protective masks is that the resistance of the valve should only be very small and yet an effective gas-tightness must be maintained. In gas masks, for example, the valve resistance should only amount to a few millimetres of water, in order that breathing may not become too difficult.

It is very natural that the simple, well known diaphragm valves should be employed for valves of this kind since these open and close easily and are very reliable in operation so that they fulfil the aforesaid requirements very well. With the ordinary diaphragm valves however, when the amount of air which is breathed in and passes through them increases, the strain on the diaphragm owing to its greater lift becomes somewhat great. This is a disadvantage which can become very troublesome with heavy breathing.

According to my present invention the aforesaid drawback is obviated by giving the diaphragm, which is made of elastic material, for example, rubber, a spherical or cup-like shape, and the cup is placed with its convex side against the seat.

In order to assist the automatic return of the diaphragm to the closed position, it is suitably fitted on a conical edge or ledge. A stop limits the lift of the diaphragm outwards.

Four embodiments of a valve in accordance with the present invention are illustrated by way of example in Figs. 1, 2, Figs. 3, 4, Figs. 5, 6, and Figs. 7, 8 which represent a vertical section and plan respectively in each case.

Figure 1:
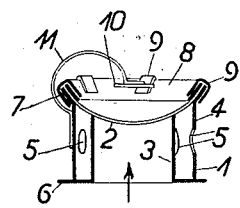

In Fig. 1, 1 is the body of the valve, 2 the diaphragm. The latter lies in its position of rest on a cylindrical pipe-like support 3, the upper edge of which is rounded off for the protection of the diaphragm. The support 3 is enclosed by a jacket 4, which serves the purpose of holding the diaphragm and which is provided with apertures 5 for the entry of the air to be breathed. A flange 6 is used for attaching the valve to the mask. The upper edge 7 of the jacket 4 is of conical shape so that the diaphragm is caused to place itself against the end of the support 3 which serves as the valve seat. That is to say, the apex of the cone formed by an imaginary inward projection of the surface of the edge 7 is below the diaphragm, or, in other words, the valve seat at the end of the support 3 and the apex of said cone are on the same side of the diaphragm. Fastening the edge of the elastic diaphragm in such conical shape therefore flexes and presses the diaphragm against the valve seat. The diaphragm is secured to the edge 7 by means of a super-imposed ring 8 and the clips 9 which are bent over it. The edge 7 and the ring 8 constitute what may be termed inner and outer annular conical members respectively, between which the edge portion of the diaphragm 2 is held. A circular plate 10 which is fitted on a bent arm 11 serves to limit the lift.

If air is breathed through the above-described valve in the direction of the arrow, the diaphragm will lift from its seat at the end of the support 3. The greater the amount of air that is breathed in the higher the valve can life without strain on it being thereby increased. If the impulse given by the breath ceases, the diaphragm returns to the position of closure on account of its elasticity which is reinforced by the conical shape of the superimposed ring, and it places itself on its seat at the end of the support 3.

Figure 3:
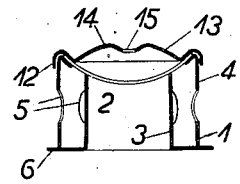
Figure 2:
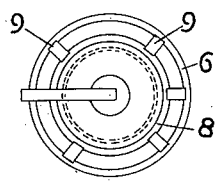
Figure 4:
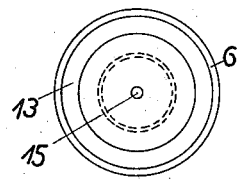

In Figs. 3 and 4, the body of the valve and the diaphragm are constructed in exactly the same manner as in the first embodiment, but the conical attachment surface is in this case formed by an inwardly extending flange 12. The stop 10, the ring 8 and the clips 9 are, on the other hand, replaced by a cap 13, which grips the jacket 4 of the body of the valve 1 on the outside. The central portion of the cap serves as a stop for the diaphragm and is provided with a recess 14 and an air-hole 15 to facilitate the movement of the diaphragm.

Figure 5:
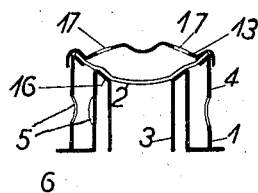
Figure 6:
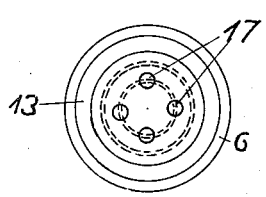

In the third embodiment according to Figs. 5 and 6, which is similar to the last form described, the valve seat at the end of the support 3 is modified. At its upper edge there is added a spherical bearing surface 16 so that with strong suction the diaphragm becomes positioned on this surface. In this manner any overstraining of the diaphragm is obviated. This relief of the strain on the diaphragm can also be effected by an auxiliary bearing surface of other shapes, for example, by a cross inserted in the tube 3, a central support or the like. The cap 13 is constructed exactly as in Figs. 3 and 4 except that in the place of one central air hole, four air holes 17 arranged in a circle are provided.

Figure 7:
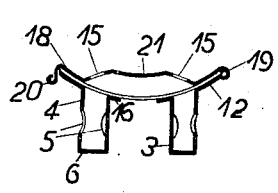
Figure 8:
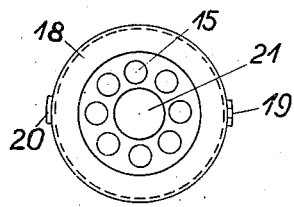

The Figs. 7 and 8 show another embodiment of my invention. The cylindrical pipe-like support 3, the end-wall 6 and the perforated jacket 4 form in this case a cylinder having spaced apart concentric walls, the outer wall of which is prolonged so as to form the conical supporting surface 12. The annular surface 16 serves to receive the diaphragm. The cover 18 is fixed to the part 12 of the valve by means of the hinge 19 and the flange 20. Between the air holes 15 of the cover there is a concavity 21 serving as a stop for the lift of the diaphragm. The valve according to the Figures 7 and 8 works in the same manner as the valves shown in the other figures.

In each of the constructions illustrated, the edge portion of the diaphragm 2 is held rigidly between two stationary conical annular surfaces, so that the central or movable portion of the diaphragm is flexed or arched properly toward its seat and held against it except when the valve opens in response to the person's breathing. Furthermore, in each of said constructions, the annular portion of the diaphragm which lies between the clamped, immovable edge portion and the seat-engaging portion, is free or unsupported, there being a space or gap between the diaphragm seat and the edge-clamping or holding means.

Having now particularly described and ascertained the nature of my said invention and in what manner the same is to be performed I declare that what I claim is:—

A diaphragm valve comprising a diaphragm made of elastic material and convex on its seating side, inner and outer annular conical members between which the edge portion of said diaphragm is held, and a seat member adapted to be engaged by the central, movable portion of said diaphragm, the diaphragm-engaging surface of said seat member being located on the same side of the diaphragm as the apex of the cone formed by an imaginary inward projection of the surface of the inner conical member, there being a gap between said diaphragm-engaging surface and the said edge-holding members, so that an unsupported annular diaphragm portion intervenes between the fastened edge portion of the diaphragm and its seat-engaging portion.

In testimony whereof I affix my signature

Dr. HANS PICK.